(12) United States Patent
Ciani

(10) Patent No.: US 8,454,234 B2
(45) Date of Patent: Jun. 4, 2013

(54) THICKNESS MEASURER FOR METAL SHEET AND RELATIVE MEASURING METHOD

(75) Inventor: Lorenzo Ciani, Udine (IT)

(73) Assignee: Danieli Automation SpA, Buttrio (IT)

( * ) Notice: Subject to any disclaimer, the term of this patent is extended or adjusted under 35 U.S.C. 154(b) by 269 days.

(21) Appl. No.: 12/936,278

(22) PCT Filed: Apr. 1, 2009

(86) PCT No.: PCT/EP2009/053901
§ 371 (c)(1),
(2), (4) Date: Oct. 4, 2010

(87) PCT Pub. No.: WO2009/121916
PCT Pub. Date: Oct. 8, 2009

(65) Prior Publication Data
US 2011/0026672 A1  Feb. 3, 2011

(30) Foreign Application Priority Data
Apr. 4, 2008  (IT) .............................. UD2008A0072

(51) Int. Cl.
*H01J 35/10* (2006.01)

(52) U.S. Cl.
USPC ......................................... 378/199; 378/141

(58) Field of Classification Search
USPC ...................... 378/130, 141, 199–200, 57, 54
See application file for complete search history.

(56) References Cited

U.S. PATENT DOCUMENTS

| 3,417,244 A | 12/1968 | Kramer |
| 4,047,029 A | 9/1977 | Allport |
| 4,309,606 A | 1/1982 | Bjorkman et al. |
| 4,696,023 A | 9/1987 | Kuusi |
| 5,233,195 A | 8/1993 | Hellstrom et al. |
| 6,377,659 B1 | 4/2002 | Snyder et al. |
| 6,491,428 B1 * | 12/2002 | Takanashi ..................... 378/200 |
| 6,705,759 B1 * | 3/2004 | Kendall et al. ................ 378/199 |

FOREIGN PATENT DOCUMENTS

| DE | 10345754 A1 | 4/2005 |
| GB | 638253 A | 6/1950 |
| JP | 60212999 A | 10/1985 |
| WO | 8402191 A1 | 6/1984 |

OTHER PUBLICATIONS

Int'l Search Report issued on Jul. 17, 2009 in Int'l Application No. PCT/EP2009/053901.

* cited by examiner

*Primary Examiner* — Hoon Song
(74) *Attorney, Agent, or Firm* — Panitch Schwarze Belisario & Nadel LLP

(57) ABSTRACT

Thickness measurer for metal elements (11), comprising a source device (20), able to emit a bundle (F) of ionizing radiations, at a predetermined or predeterminable intensity, a receiver device (24), disposed on an opposite side with respect to the metal element (11) and suitable to detect the residual intensity of the bundle (F) of ionizing radiations. The measurer comprises a cooling device, associated with the source device (20). The cooling device comprises a heat pump element (30), to remove heat from the source device (20) so as to keep the source device (20) at a predetermined and controlled temperature. The thickness measurer also comprises detection means (46, 124) for the direct or indirect detection of the intensity, or the variation in intensity, of the bundle (F) emitted by the source device (20). The detection means (46, 124) is associated with the heat pump element (30), in order to keep the emission of the bundle (F) of ionizing radiations stable.

17 Claims, 3 Drawing Sheets

THICKNESS MEASURER FOR METAL SHEET AND RELATIVE MEASURING METHOD

CROSS-REFERENCE TO RELATED APPLICATION

This application is a Section 371 of International Application No. PCT/EP2009/053901, filed Apr. 1, 2009, which was published in the English language on Oct. 8, 2009, under International Publication No. WO 2009/121916 A1 and the disclosure of which is incorporated herein by reference.

BACKGROUND OF THE INVENTION

It is known to measure the thickness of a strip or metal sheet exiting from a rolling pass by detecting the absorption of a bundle of ionizing radiations, for example X rays, emitted by a source and striking, advantageously perpendicularly, a surface of the sheet. A part of the bundle of rays is attenuated since it is absorbed both according to the type of material which makes up the sheet, and also according to the thickness that the bundle of rays passes through. The component of the bundle that passes through the sheet is measured by a receiver element disposed on the opposite side with respect to the source of the bundle, thus allowing to measure the thickness.

To ensure both adequate accuracy and repeatability of the measurements of thickness, it is necessary for the emission to be kept stable, for example by keeping the emission source at a constant or controlled temperature.

Known cooling devices, for example with the circulation of cooling fluid, in contact with the walls of the emission tube, are not always effective, they require complex systems to feed, circulate and discharge the fluid and are costly to install and maintain. Consequently, it is not always possible to guarantee accurate measurements in all working conditions.

One purpose of the present invention is to achieve a thickness measurer for metal sheet or strip and the relative measuring method, which allow to carry out the measurements with the desired accuracy and repeatability even when the working conditions vary.

Another purpose of the present invention is to achieve a thickness measurer which allows to reduce the cost of the measurer and also the costs of management and maintenance.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a thickness measurer for metal elements, such as sheet or strip, comprises a source device suitable to emit a bundle of ionizing radiations, such as for example a bundle of X rays, at a predetermined or predeterminable intensity.

The measurer comprises a receiver device, disposed on the opposite side with respect to the metal element and suitable to detect the intensity of the residual bundle of ionizing radiations in order to obtain information on the thickness of the metal element.

The measurer also comprises a cooling device associated with the source device.

According to a characteristic feature of the present invention, the cooling device comprises a heat pump element suitable to remove the heat from the source device in order to keep the source device at a predetermined and controlled temperature. The thickness measurer also comprises detection means, able to detect either directly or indirectly the intensity or the variation in intensity of the bundle of ionizing radiations emitted by the source device. The detection means is also associated with the heat pump element, so as to keep the emission of the bundle of ionizing radiations stable. In this way it is possible to regulate the removal of heat, by means of the heat pump element, substantially controlling the temperature of the source device and keeping the emission of the bundle of ionizing radiations stable.

In a first solution, non-restrictive, the detection means comprises a device associated with the exit of the source device, suitable to detect directly the intensity of the bundle of radiations emitted so as to obtain information in this way on the stability of the source.

According to a variant, the detection means comprises a temperature probe associated with the source device or a support element thereof. Therefore it is possible to obtain information indirectly on the stability of emission of the source device by detecting its temperature.

According to another characteristic feature the heat pump element is coupled with a tubular element to conduct the air. In this way the heat produced by the source device during the emission of the bundle of radiations is picked up by the heat pump element and transferred to the tubular structure. In turn the heat transferred to the tubular element is progressively removed in a continuous manner by means of air convection, allowing to dispose of the excess heat and to keep the source device at a controlled temperature.

According to another characteristic of the present invention, the cooling device also comprises a dissipation element, coupled with the heat pump element and disposed in the tubular structure so as to facilitate the transfer, substantially through irradiation, of heat from the heat pump element and therefore its removal from the tubular element.

According to a variant of the present invention, the heat pump element comprises at least a Peltier cell.

According to another variant, an electric quantity used to regulate the quantity of heat removable by the Peltier cell is associated with a corresponding electric quantity used to regulate the intensity of the bundle of ionizing radiations. In this way it is possible to regulate the quantity of heat removable from the source device according to the actual quantity of heat produced by the source device during the emission of the bundle of ionizing radiations.

The present invention also concerns a method to measure the thickness of metal elements such as sheet or strip, which comprises a step of cooling a source device during the emission of a bundle of ionizing radiations, used to measure the thickness. The cooling is effected by means of a heat pump element, able to remove the heat from the source device, in order to keep the source device at a predetermined and controlled temperature. Furthermore, by means of detection means, the intensity or variation in intensity of the bundle of ionizing radiations emitted by the source device is detected, either directly or indirectly. The detection means is associated with the heat pump element so as to keep the emission of the bundle of ionizing radiations stable.

According to a variant, the heat pump element comprises at least a Peltier cell.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 1:
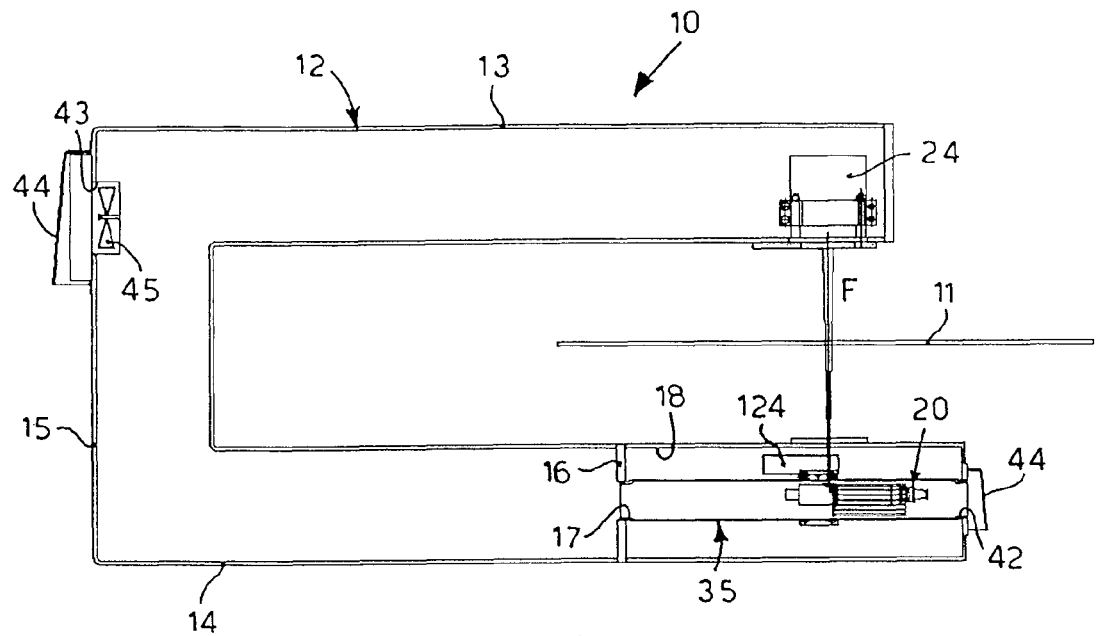
FIG. 1 is a lateral schematic view of a thickness measurer according to the present invention.

With reference to the attached drawings, a thickness measurer 10 for metal sheet 11 according to the present invention is suitable to measure the thickness of sheet 11 or other metal elements exiting as finished or semi-finished products from a rolling pass or other process to reduce thickness. The measurer 10 comprises a box-like body 12, substantially hollow and suitable to contain both a device 20 to generate X rays and also an associated detector 24 suitable to detect the intensity of radiation emitted. The generator device 20 is of a known type, such as for example an elongated Roentgen tube having an emission window 21 in correspondence with one anode.

The box-like body 12 (FIG. 1) comprises a first arm 13, hollow and substantially horizontal, suitable to contain the detector 24 at one end, a second arm 14, also hollow and substantially horizontal and disposed in a substantially parallel manner to the first arm 13. The second arm 14 is suitable to contain the generator device 20, in one end. The box-like body 12 also comprises a third arm 15 connecting the first arm 13 and the second arm 14. Therefore, the box-like body 12 is U-shaped so that the generator device 20 and the associated detector 24 are substantially opposite. Furthermore, the disposition of the two arms 13, 14 is such as to define a seating for positioning a sheet 11 of which the thickness is to be measured.

The box-like body 12 also comprises a first hole 42, made in a terminal wall closing the end of the second arm 14 and suitable to emit air from inside the box-like body 12 itself. The box-like body also comprises a second hole 43, made in a lateral wall of the third arm 15, substantially at the height of the first arm 13, which allows the air to pass. Each first and second hole 42, 43 is protected frontally by a box-like element 44, suitable to define respectively a seating for the entrance/exit of air.

The second arm 14 also comprises a dividing wall 16 suitable to define a chamber 18. The dividing wall 16 comprises a hole 17 coupled with a first end of a pipe 35, with a square or rectangular section, which passes through the chamber 18 for the whole of its length. The pipe 35 is also coupled at a second end with the second hole 42, thus defining a seating for the air to pass.

Figure 3:
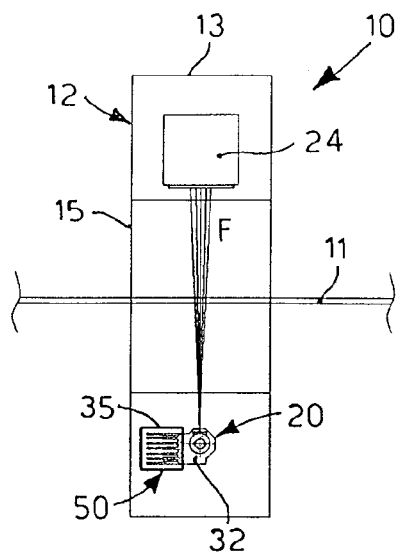
FIG. 3 is a front schematic view of the device in FIG. 1.
Figure 4:
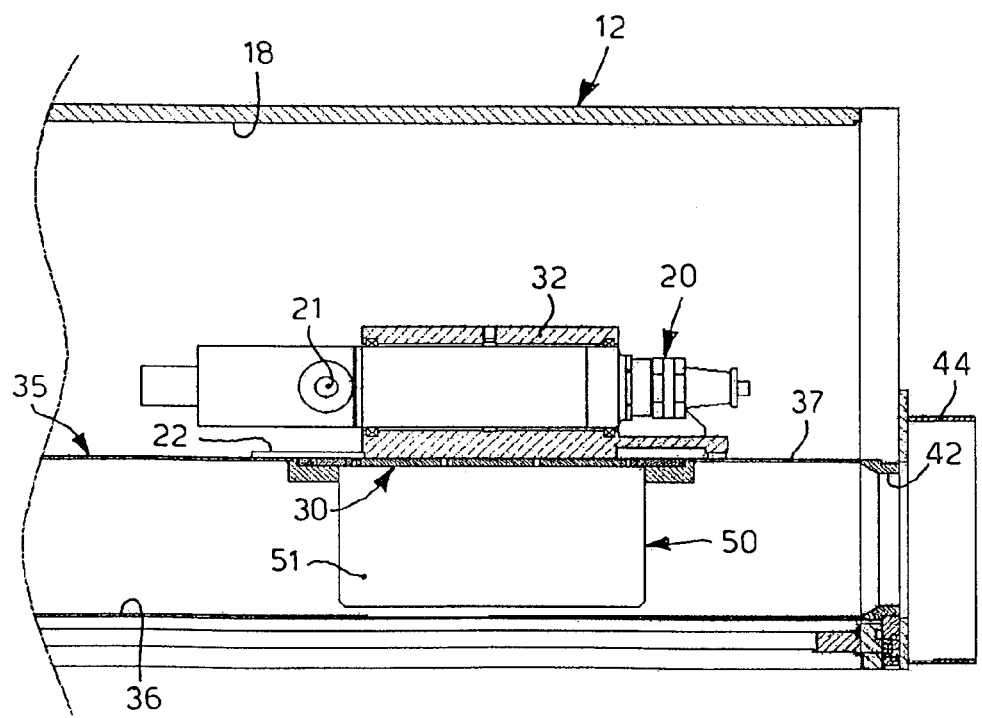
FIG. 4 is a view from above of FIG. 2.

The chamber 18 is suitable for housing the device 20 that generates the bundles of X rays and a corresponding device to remove heat comprising a casing 32 coupled with the X ray generator device 20. The casing 32 (FIGS. 3 and 4), having a predetermined thickness according to the power that can be dissipated by the generator device 20, is suitable to surround longitudinally the body of the generator device 20 and thus facilitate the disposal, substantially through conduction, of the heat produced by the emission device 20.

The casing 32, together with the generator device 20, is attached in correspondence with a plane surface to a vertical wall 37 of the pipe 35 and outside the pipe 35.

The measurer also comprises a ventilator 45, associated with the second hole 43, suitable to take in air from the outside and put the box-like body 12 under pressure for the forced conduction of air through respectively the third arm 15, the second arm 14 and the pipe 35.

The measurer 10 also comprises a heat removal device, associated with the generator device 20 and suitable to remove, in the desired manner, the excess heat produced by the generator device 20.

The removal device comprises at least a Peltier cell 30 (FIG. 4), disposed substantially on a portion of said wall 37, so that a cold surface thereof is in direct contact with said plane surface of the casing 32. The Peltier cell 30 is suitable to act as a heat pump element and to facilitate the transfer of heat from the generator device 20.

Figure 5:
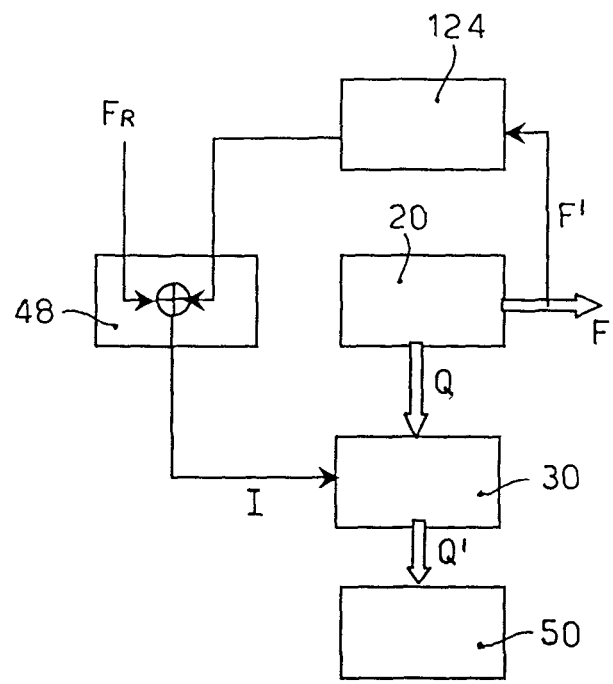
FIG. 5 is a block diagram of the measuring method according to the present invention.

The thickness measurer 10 also comprises a detector device 124 (FIGS. 1 and 5) to detect the intensity of the bundle F of X-rays, associated with the emitter 21 and suitable to detect a portion F' of the intensity of radiations emitted. The detector device 124 is connected to a processing and control unit 48, in turn connected to the Peltier cell 30, to regulate an electric quantity thereof, for example a current I, and allow to control the quantity of heat Q that can be removed from the generator device 20.

Figure 2:
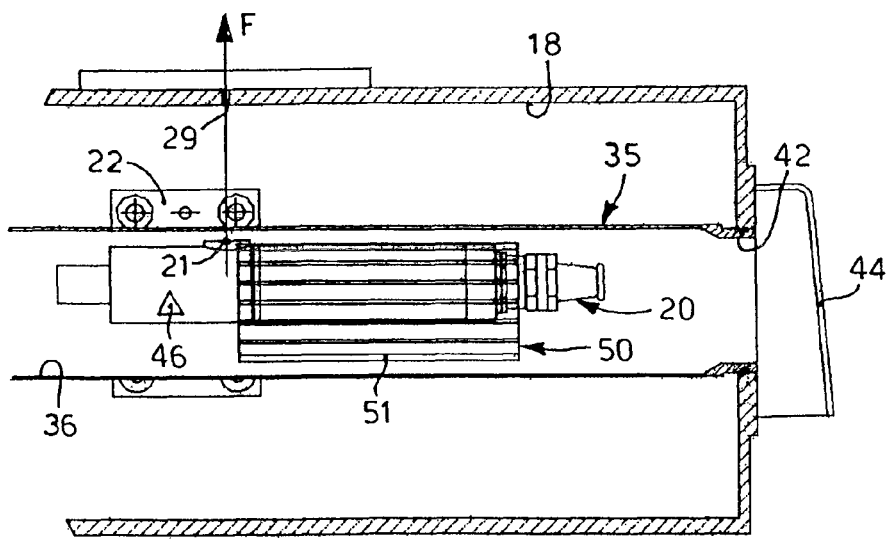
FIG. 2 is an enlarged view of a detail in FIG. 1.

The heat removal device also comprises a dissipater 50 disposed inside the pipe 35. The dissipater 50 is mounted in direct contact with a hot surface of said Peltier cell 30 so as to dissipate a second quantity of heat Q', received from the hot surface of the Peltier cell and substantially identical to the quantity of heat Q. The dissipater 50 comprises plane fins 51 (FIGS. 2 and 4) suitable to define an efficient dissipation profile for the heat. The fins 51 extend transversely inside the pipe 35 so as to facilitate the passage of air between the fins 51.

The thickness measurer 10 as described heretofore functions as follows.

To control and measure the thickness of a sheet 11, the sheet 11 is made to pass between the first arm 13 and the second arm 14 of the measurer 10. In this way, the sheet 11 is positioned between the source device 20 and the detector 24, so as to intercept, in correspondence with a portion to be examined, the bundle F of X rays emitted by the emission window 21 of the emission device 20 and exiting from an aperture 29 of the second arm 14, provided with a diaphragm suitable for the passage of the bundle of X rays, blocking other unwanted components for the measurement, such as dust or other. A portion of bundle F, attenuated following its passage through the sheet 11, is detected by the detector 24 and the value of the residual intensity detected provides, in a known manner and according to the type of metal material that makes up the sheet 11, the measurement of the thickness of the sheet 11.

The heat generated by the generator device 20 during the emission of the bundle F of X rays is dissipated through conduction toward the casing 32 and then in turn transferred by the action of the heat pump element from the cold surface to the hot surface of the Peltier cell 30.

The processing and control unit 48 (FIG. 5) detects a portion F' of radiation intensity corresponding to the emission intensity of the bundle F of X rays emitted by the emission window 21. The processing and control unit 48 compares the portion F' with a reference value $F_R$, substantially corresponding to the emission of the bundle F of X rays by the generator device 20 with desired intensity. The processing and control unit 48 therefore regulates the current I, correlated to the quantity of heat Q removable by the Peltier cell 30, so as to keep the emission of the bundle F constant. Therefore, with any variation in the portion F' supplied by the detector device 124 with respect to said reference value $F_R$, the processing and control unit 48 acts by modifying the current intensity I controlling the Peltier cell 30 so as to remove a greater or lesser quantity of heat Q, suitable to keep the generator device 20 in conditions of constant emission.

Finally, for a further conductive transfer, the second quantity of heat Q' is transferred to the dissipater 50 and the cooling fins 51. The heat dissipated by heat irradiation by the fins 51 into the air inside the pipe 35 is progressively disposed of by means of forced air conduction inside the pipe 35, produced by the ventilator 45 through the pipe 35 and the cavities of the arms 14, 15, exiting from the first hole 42.

In this way it is possible to subtract in a controlled and progressive manner the excess heat produced by the generator device 20, allowing to keep the latter at a controlled temperature which allows to keep the emission of the bundle F of X rays constant and stable over time, and thus to ensure accuracy and repeatability in measuring the thickness.

Figure 6:
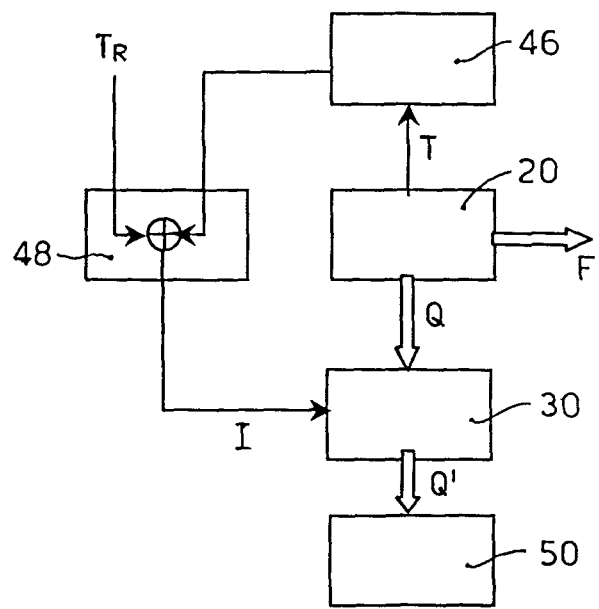
FIG. 6 is a block diagram of a variant of the method in FIG. 5.

According to a variant shown in the block diagram in FIG. 6, the thickness measurer 10 comprises a temperature probe 46, associated with the generator device 20, and suitable to detect the temperature T, or the variations in temperature, of the generator device 20 during the emission of the bundle F. The processing and control unit 48 (FIG. 5) reads the temperature T supplied by the temperature probe 46 and compares it with a reference temperature value, or set point, $T_R$, substantially corresponding to an emission of the bundle F of X rays from the generator device 20 with a desired and constant intensity during the measurement of the thickness of the sheet 11. The processing and control unit 48 therefore regulates the current I regulating the quantity of heat Q removable by the Peltier cell 30 so as to keep the temperature of the generator device 20 constant and thus the emission of the bundle F. Therefore, with every variation in the temperature T detected by the temperature probe 46 with respect to the reference value $T_R$, the processing and control unit 48 acts by modifying the current I of the Peltier cell 30 so as to remove a greater or lesser quantity of heat Q, suitable to keep the generator device 20 at the reference temperature $T_R$ and hence to keep the intensity of the bundle F constant and stable.

It is clear that modifications and/or additions of parts may be made to the thickness measurer for sheet and the relative measuring method as described heretofore, without departing from the field and scope of the present invention.

It is also clear that, although the present invention has been described with reference to some specific examples, a person of skill in the art shall certainly be able to achieve many other equivalent forms of thickness measurer for sheet and the relative measuring method, having the characteristics as set forth in the claims and hence all coming within the field of protection defined thereby.

The invention claimed is:

1. Thickness measurer for metal elements, comprising:
a casing surrounding a body of a source device able to emit a bundle of ionizing radiations at a predetermined or predeterminable intensity;
a receiver device, disposed on an opposite side with respect to said metal element, able to detect a residual intensity of said bundle of ionizing radiations; and
a cooling device, able to cool the source device, the cooling device comprising a heat pump element controlled by an electric quantity and having a surface in direct contact with a surface of said casing, said heat pump element being configured to remove heat from the source device so as to keep said source device at a predetermined and controlled temperature,
wherein the measurer further comprises detection means able to detect, directly or indirectly, the intensity, or the variation in intensity, of the bundle of ionizing radiations emitted by the source device, and associated with said heat pump element, and
wherein the measurer comprises a processing and control unit connected to said detection means and to said heat pump element in order to regulate said electric quantity supplied to said heat pump element according to a detection of said detection means for controlling a quantity of heat removed by said cooling device in order to keep an emission of the bundle of ionizing radiations stable.

2. Measurer as in claim 1, wherein said detection means comprises a detector device associated at an exit of the source device able to detect an intensity of radiations emitted by the source device, so as to obtain information on the stability of the source device.

3. Measurer as in claim 1, wherein said detection means comprises a temperature probe associated with the source device, or with a support element thereof, so as to obtain indirect information on the stability of emission of the source device.

4. Measurer as in claim 1, wherein the heat pump element is coupled with a tubular element, able to remove through convection, air heated following the transfer of heat by the heat pump element.

5. Measurer as in claim 1, wherein the cooling device also comprises a dissipation element, coupled with the heat pump element and disposed in the tubular element so as to accelerate the transfer of heat from the heat pump element to the tubular element.

6. Measurer as in claim 5, wherein said dissipation element-comprises fins disposed transversely inside the tubular element so as to facilitate the passage of air and the dissipation of heat in said tubular element.

7. Measurer as in claim 1, characterized in that said heat pump element comprises at least a Peltier cell.

8. Measurer as in claim 7, characterized in that the electric quantity used to regulate the quantity of heat removed by the Peltier cell is associated with a corresponding electric quantity used to regulate the intensity of the bundle of ionizing radiations of said source device.

9. Measurer as in claim 1, characterized in that said bundle of ionizing radiations comprises of X rays.

10. Method for measuring a thickness of a metal element comprising:
emitting from a source device a bundle of ionizing radiations at a predetermined or predeterminable intensity toward the metal element, the source device being surrounded by a casing;
detecting by a receiver device, disposed on the opposite side with respect to the metal element, an intensity of a residual bundle of ionizing radiations, indicative of the thickness of the metal element;
cooling the source device during an emission of the bundle of ionizing radiations, wherein said cooling is effected by a heat pump element controlled by an electric quantity and having a surface in direct contact with a surface of said casing, the heat pump able to remove a quantity of heat from the source device, in order to maintain the source device at a predetermined and controlled temperature;
detecting directly or indirectly with a detection means an intensity, or a variation in intensity, of the bundle emitted by the source device, said detection means being associated with said heat pump element; and controlling removal of heat with a processing and control unit, connected to the detection means and to the heat pump element, the processing and control unit able to regulate an electric quantity of said heat pump element, in order to remove the quantity of heat from said heat pump element according to information relating to the variations in intensity of the bundle of the source device supplied by said detection means in order to keep an emission of the bundle of ionizing radiations stable.

11. Method as in claim 10, wherein said detection means comprises a device associated at exit of the source device able to detect an intensity of radiations emitted by the source device, so as to obtain information on the stability of the source device.

12. Method as in claim 10, wherein said detection means comprises a temperature probe associated with the source device, or with a support element thereof, so as to obtain indirect information on the stability of emission of the source device.

13. Method as in claims 11, wherein the removal of heat also provides to transfer heat removed by the heat pump element to an associated heat conduction tubular element.

14. Method as in claim 13, wherein the removal of heat provides to use a dissipation element, coupled with the heat pump element and disposed in the tubular element so as to facilitate the transfer of heat by the heat pump element to the tubular element.

15. Method as in claim 10, wherein said heat pump element comprises at least a Peltier cell.

16. Method as in claim 11, characterized in that said bundle of ionizing radiations comprises of X rays.

17. A thickness measurer for a metal element comprising:
a radiation source disposed on a first side of the metal element, the radiation source able to emit ionizing radiation at a predetermined or predeterminable intensity;
an emittance detector disposed between the radiation source and the first side of the metal element, the emittance detector able to detect the intensity of a portion of the emitted radiation;
a thermoelectric heat pump thermally coupled to the radiation source, the thermoelectric heat pump able to remove a quantity of heat from the radiation source in response to an electric quantity input to the heat pump;
a control unit connected to the emittance detector and the heat pump, the control unit able to maintain the radiation source at a predetermined and controlled temperature and to keep the emitted radiation stable by regulating the electric quantity input to the heat pump in response to a variation in the intensity of the portion of the emitted radiation detected by the emittance detector; and
a receiver device disposed on a side of the metal element opposite the first side, the receiver device able to detect a residual intensity of the emitted radiation passing through the metal element.

* * * * *